United States Patent
Kyösti

(10) Patent No.: US 9,020,440 B2
(45) Date of Patent: Apr. 28, 2015

(54) RADIO CHANNEL DATA AND THE USE THEREOF

(75) Inventor: Pekka Kyösti, Jokirinne (FI)

(73) Assignee: Anite Telecoms Oy, Oulu (FI)

( * ) Notice: Subject to any disclaimer, the term of this patent is extended or adjusted under 35 U.S.C. 154(b) by 208 days.

(21) Appl. No.: 13/371,960

(22) Filed: Feb. 13, 2012

(65) Prior Publication Data

US 2013/0210474 A1  Aug. 15, 2013

(51) Int. Cl.
  *H04B 17/00* (2006.01)

(52) U.S. Cl.
  CPC .......... *H04B 17/0087* (2013.01); *H04B 17/364* (2015.01); *H04B 17/391* (2015.01)

(58) Field of Classification Search
  USPC ............................................. 455/67.11, 517
  See application file for complete search history.

(56) References Cited

U.S. PATENT DOCUMENTS

| | | |
|---|---|---|
| 2005/0267715 A1 | 12/2005 | Kolu et al. |
| 2009/0299717 A1 | 12/2009 | Zhao et al. |
| 2010/0093300 A1 | 4/2010 | Nuutinen et al. |
| 2011/0299570 A1* | 12/2011 | Reed ............................ 375/130 |
| 2012/0225624 A1 | 9/2012 | Kyosti et al. |

FOREIGN PATENT DOCUMENTS

| | | |
|---|---|---|
| EP | 2 169 888 A1 | 3/2010 |
| WO | 2010040887 A1 | 4/2010 |
| WO | 2010094000 A2 | 8/2010 |
| WO | 2010139840 A1 | 12/2010 |

OTHER PUBLICATIONS

Kyosti, P. et al., MIMO OTA test concept with experimental and simulated verification. 2010 Proceedings of the Fourth European Conference on Antennas and Propagatioin (EuCAP). New Jersey: IEEE, 2010. 5 pages. ISBN 978-1-4244-6431-9; ISBN 1-4244-6431-5. Epoquenet NPL: XP031705569.
International Search Report and Written Opinion, International Application No. PCT/FI2013/050130, May 29, 2013.
Rohde & Schwarz, "Cost-Effective Over-the-Air Performance Measurements on MIMO Devices", 3GPP Draft; R4-091710, 3rd Generation Partnership Project (3GPP), Mobile Competence Centre; 650, Route Des Lucioles; F-06921 Sophia-Antipolis Cedex; France, no. San Francisco; 20090504, May 4, 2009, XP050342455.
Extended European Search Report, Application No. 13154331.6-1855, Dated Sep. 29, 2014, 8 pages.

* cited by examiner

*Primary Examiner* — Tuan H Nguyen
(74) *Attorney, Agent, or Firm* — Arent Fox LLP

(57) ABSTRACT

An apparatus comprises a receiver receiving wireless transmission of a real radio system from at least one base station of a radio system as a function of reception direction. The transmission comprises predetermined data. The apparatus comprises also a processing unit that forms taps of a delay profile on the basis of comparison between the data that is received and corresponding predetermined data. The processing unit estimates direction for the taps of the delay profile on the basis of a reception direction of the transmission, and forms radio channel data by associating the taps of the delay profile with the estimated direction. The radio channel data is for a radio channel model of a MIMO emulation in an OTA chamber having a plurality of antennas around a test zone where a device-under-test may be placed.

20 Claims, 6 Drawing Sheets

RADIO CHANNEL DATA AND THE USE THEREOF

BACKGROUND

1. Field

The invention relates to gathering radio channel data and its use.

2. Description of the Related Art

Communication between a DUT (Device Under Test) and a base station of a radio system can be tested using an OTA (Over-The-Air) test, where a real DUT, such a mobile terminal, is surrounded by a plurality of antennas coupled with an emulator in a chamber which has as low echoes as possible. The emulator may be coupled to or act as a base station and emulate propagation paths between the mobile terminal and the base station according to a channel model by generating independent Rayleigh faded signals, for example. OTA antennas transmit pre-processed communication signals to the DUT on the basis of weights determined by the emulated radio channel.

There is an interest to measure mobile terminals in live networks, i.e. in existing installed networks in specific environments. Terminal vendors would like to measure and "debug" their products in an OTA chamber having emulated environments as realistic as possible. Operators, in turn, would like to measure and "de-bug" problematic areas of their installed networks in an OTA chamber.

However, the emulated radio channels of the OTA chamber do not correspond well enough to the real radio channels. Hence, there is a need for better radio channel data.

SUMMARY

The following presents a simplified summary of the invention in order to provide a basic understanding of some aspects of the invention. Its purpose is to present some concepts of the invention in a simplified form as a prelude to the more detailed description that is presented later.

An aspect of the invention relates to apparatus of claim 1.
An aspect of the invention relates to apparatus of claim 7.
An aspect of the invention relates to a method of claim 10.
An aspect of the invention relates to a method of claim 16.
An aspect of the invention relates to apparatus of claim 19.
An aspect of the invention relates to a computer program product of claim 20.

Although the various aspects, embodiments and features of the invention are recited independently, it should be appreciated that all combinations of the various aspects, embodiments and features of the invention are possible and within the scope of the present invention as claimed.

The present solution provides advantages. There are several efficient ways to gather proper radio channel data which enable for a realistic radio channel emulation.

BRIEF DESCRIPTION OF THE DRAWINGS

In the following the invention will be described in greater detail by means of exemplary embodiments with reference to the attached drawings, in which.

DETAILED DESCRIPTION

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

When a radio frequency signal is transmitted from a transmitter to a receiver, the signal propagates in a radio channel along one or more paths having different angles of arrivals, signal delays, polarizations and powers. Also a frequency may change due to the Doppler effect. These changes may cause variation in signal strength and fadings of different durations. In addition, noise and interference due to other transmitters interfere with the radio connection.

A transmitter and a receiver can be tested using a radio channel emulator emulating real circumstances. In a digital radio channel emulator, a radio channel is usually modelled with an FIR filter (Finite Impulse Response).

Channel impulse responses and optimization of the antenna weights in OTA may be formed such that an accurate correlation, an angle of arrival and polarization properties are possible for a DUT. The described solution may gather radio channel data from a live and real radio system. In emulation, the described solution may also use at least one transmitter, a multidimensional radio channel emulator, an anechoic chamber, OTA antennas coupled with separate radio channels inside the anechoic chamber and a DUT in the anechoic chamber, for example.

Figure 1:
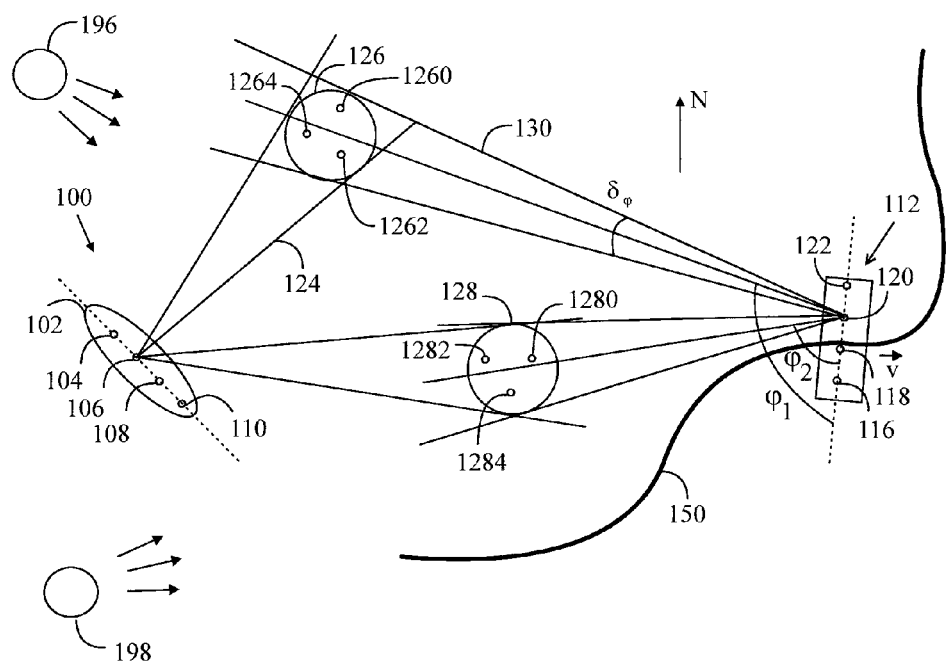
FIG. 1 shows a receiver which gathers radio channel data from a radio system.

In FIG. 1 a receiver 112 is moving with velocity v along a road or some other route 150 and is receiving wireless transmission from at least one base station 196, 198, 100 of a radio system. The radio system may be based on the following technologies: 3GPP (Third Generation Partnership Project) LTE (Long Term Evolution), WiMAX (Worldwide Interoperability for Microwave Access), Wi-Fi and/or WCDMA (Wide-band Code Division Multiple Access). The receiver 112 is a scanner which gathers radio channel data for a multiple input multiple output playback emulation which is performed in an over-the-air chamber having the antennas 102 to 116 around a test zone 920 and the DUT 900 (see also FIG. 9).

A playback emulation with a MIMO (Multiple Input Multiple Output) OTA setup requires directional information on the receiver 112, which is not available in prior art measurements. With multiple scanner antennas 116 to 122 both the temporal channel realization and the directional information can be collected on the basis of received transmission.

The receiver 112 receives predetermined data of the transmission from at least one base station 196, 198, 100 as a function of reception direction. A transmission comprising the predetermined data may include downlink reference signals in the LTE (Long Term Evolution), for example. Transmission having predetermined data may be called a pilot signal, too. In general, the predetermined transmission comprises a known sequence of bits and the transmission may be regularly or irregularly repeated. A radio channel distorts the predetermined transmission in its path from the transmitter to the receiver. The distortion may be determined when received bits of the predetermined transmission are detected and compared with the actual predetermined bits in the receiver. When the distortion is determined, it may be reproduced in the radio channel emulation.

All transmitters 196, 198, 100 may be similar to the transmitter 100 and hence only the transmitter 100 is explained in more detail in the following.

The transmitter 100 may comprise at least one antenna 104 to 110. In this example, the transmitter 100 may be a base station of a radio system. The receiver 112 comprises at least one antenna 116 to 122. In a MIMO system both the transmitter 100 and the receiver 112 have a plurality of antennas which results in improvement in communication performance and data throughput. In this example, the receiver 112 may be a subscriber terminal of a radio system.

When the transmitter 100 transmits a radio signal, the transmission 124 may be received through line-of-sight and/or the transmission may hit at least one cluster 126, 128 which reflects and/or scatters the radiation. Each cluster 126, 128 may have a number of active regions 1260 to 1264, 1280 to 1284 which predominantly reflect and/scatter in the cluster 126, 128. A cluster 126, 128 may be fixed or moving, and the cluster 126, 128 may be a natural or man-made object, such as a building, a train, a mountain etc. The active regions may be some finer structural features on an object.

The reflected and/or scattered beam may be directed towards the antennas 116 to 122 of the receiver 112. Each antenna 116 to 122 may have a reception angle $\phi_1$ and its angle spread may be $\delta_\phi$ which may be $a\delta_\phi^{std}$, where a is a real number larger than zero and $\delta_\phi^{std}$ is the standard deviation of angle $\phi_1$. The transmission 130 reflected and/or scattered from the cluster 126 may then be received. Similarly, the antennas 116 to 122 may also have a beam from a reception angle $\phi_2$ and its angle spread may be $\delta_{\phi 2}$. The propagation from the transmitter 100 to the receiver 112 via at least one cluster 126, 128 causes an additional delay to a signal with respect to a signal traveling straight along a line of sight. Similarly, transmissions of all base stations 196, 198, 100 may be received through line-of-sight or from at least one cluster.

The clusters 126, 128 in a radio channel are responsible for multi-path propagation. It can be considered that one received path comes from one cluster. Hence, a radio channel may be described on the basis of clusters.

Clusters may also cause changes in polarization of the transmission in the radio channel, for example.

In an embodiment, when performing a live radio network measurement the direction of the receiver 112 and hence the scanner antennas 116 to 122 with respect to global coordinates may be measured. In FIG. 1, a direction to the north is marked with an arrow with a letter N. The measured directions of the receiver 112 may be recorded in memory 204 (see also FIG. 2).

In an embodiment, the directions and turns of the receiver 112 may be measured for example by applying a global satellite system. The receiver 112 may comprise a positioning receiver (not shown in FIG. 1) based on the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example.

In an embodiment, the receiver 112 may determine its location by utilizing other known positioning techniques. It is well known that by receiving radio signals from several different base stations, a mobile phone may determine its location, for example.

When positions at different moments are measured, a direction of the receiver 112 may be defined to be towards the movement in consecutive line of measured positions. If the direction of the receiver 112 is not towards the movement in consecutive line of measured positions, it in any case depends on the direction of the movement in a predetermined manner since antennas 116 to 122 are in a fixed position with the receiver 112.

If the position of the receiver 112 is measured three-dimensionally, also the up hills and down hills may be measured.

Alternatively or additionally, some kind of electronic compass may be used for determining the direction of the receiver 112.

The rotations of the receiver 112 horizontally and/or vertically may be compensated out when performing the emulation. Hence, the real radio system may be emulated as if driving straight through the radio system although the live recording took place along a curvy and potentially hilly road.

Figure 2:
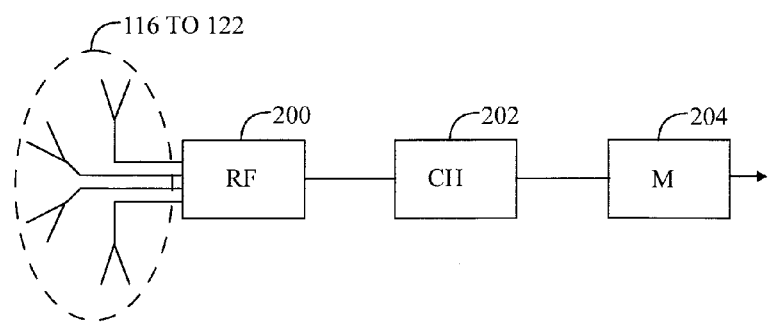
FIG. 2 shows a receiver.

FIG. 2 presents a block diagram of the receiver. The receiver 112 has at least two antennas 116 to 122, a mixer unit 200 and a processing unit 202. Additionally, the receiver 112 may have memory 204. The processing unit 202 may comprise a processor. When the antennas 116 to 122 receive radio frequency signals, the mixer unit 200 down converts the radio frequency signals to lower frequencies in a base band. The base band signals are converted in a digital form and fed to the processing unit 202 which performs radio channel estimation.

The processing unit 202, which may comprise a channel estimator, forms temporal radio channel data by forming taps of a delay profile on the basis of comparison between the data that is received and corresponding predetermined data.

In a simple form, the received signal y in each receiving antenna may be expressed in matrix form as:

$$y = Mh + n,$$

where M comprises the predetermined data, h is the complex radio channel impulse response and n refers to noise and interference. The complex radio channel impulse response h can be estimated at certain probability since y and M are known. A radio channel estimate H may be formed by minimizing the error between the received signal y and the product of the predetermined data M and the radio channel estimate H. A thus formed radio channel estimate H or a delay profile is a temporal channel data that can be obtained by gathering information from transmission of a real radio system. Each element $H_1, \ldots, H_n$ in the radio channel estimate H is a tap at a certain delay. Each delay profile represents a radio channel measured over a short time. Typically the time needed for the delay profile may correspond to about 40 wavelengths of a carrier frequency at the speed of light. However, the time over which a delay profile is averaged or integrated may be different, for example 1 to 1000 wavelengths. The actual impulse responses that are used in play-back simulation may or may not be filtered by averaging. Too short a time of averaging leads to emergency of ghost taps, i.e. taps which are noise, and too long a time of averaging leads to too smooth radio channel, i.e. important fadings and other sudden changes in radio channel may not be observed. For example, a strong tap with a long delay may appear momentarily. If the duration of the tap is longer than a certain period of time such as a cyclic prefix in the LTE, the connection between the base station and the mobile phone may get cut off. It is desirable that such a situation is not filtered out but can be recorded and repeated during emulation.

Figure 3:
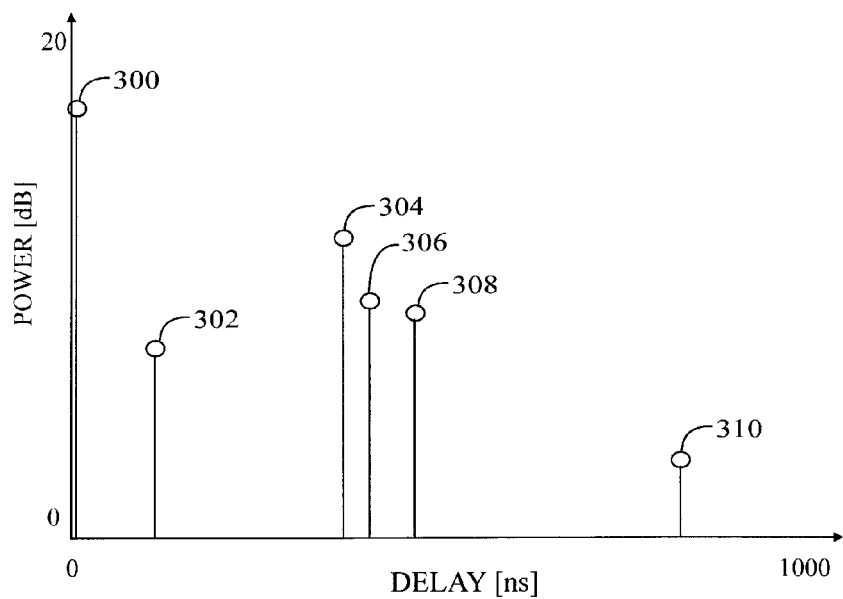
FIG. 3 shows a power delay profile.

A PDP (Power Delay Profile) of six clusters 300, 302, 304, 306, 308 and 310 is illustrated in FIG. 3.

The processing unit 202 also estimates direction for the taps of the delay profile on the basis of a reception direction of the transmission and associates each tap with data on the reception direction for providing directional delay profiles which implies that they include directional information. The formed radio channel data may be stored in memory 204.

Figure 4:
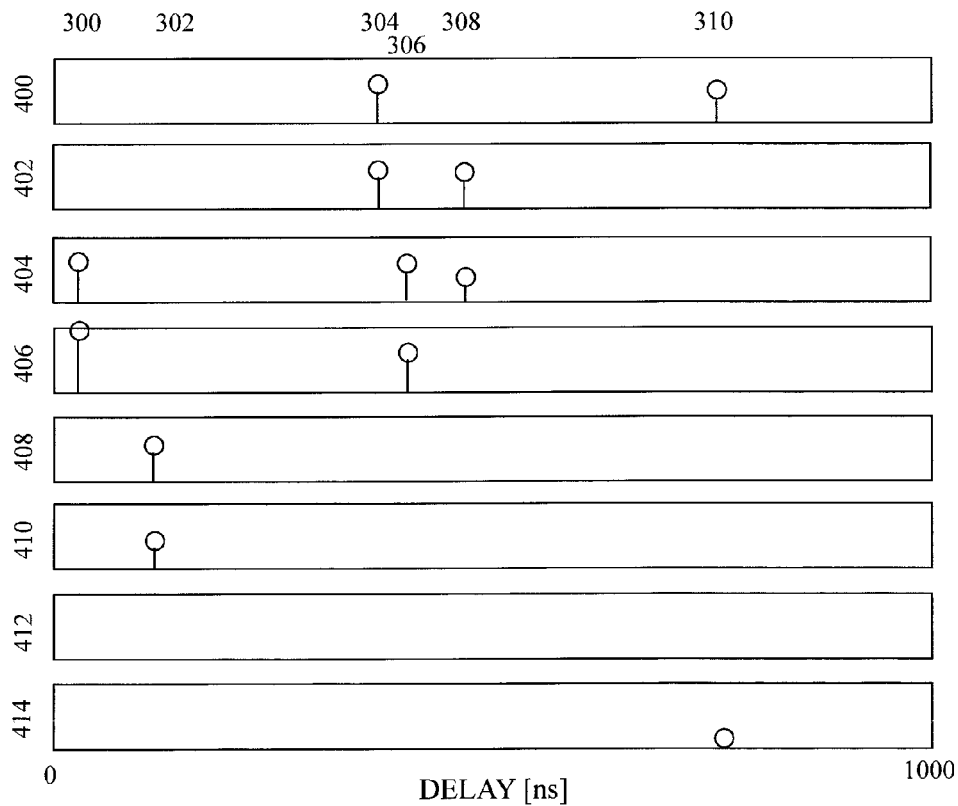
FIG. 4 shows directionally dependent delays.

Directionally different delay profiles 400 to 414 from eight directions are depicted in FIG. 4. Each of the directional delay profiles 400 to 414 may have been received by one directional antenna of the receiver 112. There are six clusters 300 to 308 which are the same as on FIG. 3. Different clusters have different delays in this example. In general, different clusters may have the same delay.

In an embodiment, the processing unit 202 may perform the association of taps with data on reception directions by forming a radio channel model such that the radio channel data is mapped on the antennas of the over-the-air chamber if a configuration of the OTA antennas 902 to 916 around the test zone is known. However, the mapping may not be made in the processing unit 202 but in the emulator 918 in conjunction with the emulation.

Figure 5A:
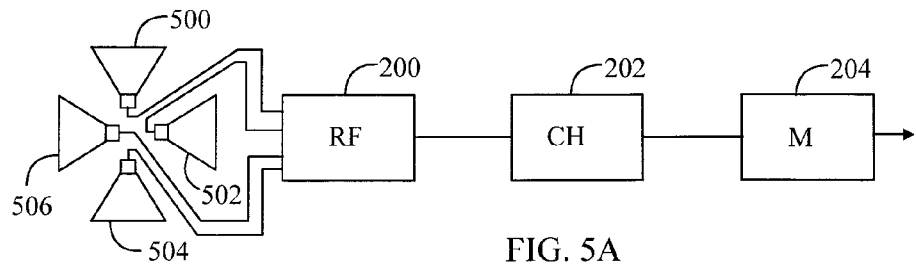
FIG. 5A shows a receiver with directional antennas.

FIG. 5A presents an embodiment of a receiver 112. The receiver 112 may comprise a plurality of directional scanner antennas 500, 502, 504, 506 which correspond to the antennas 116 to 122 of the receiver 112. A directional distribution of the directional scanner antennas 500 to 506 may be similar to that of the antennas in the over-the-air chamber. An angular distribution of the directional scanner antennas 500 to 506 may be similar to that of the antennas in the over-the-air chamber. A spatial distribution of the directional scanner antennas 500 to 506 may be similar to that of the antennas in the over-the-air chamber. Assume that the antennas 902 to 916 in the OTA chamber are placed in a circle around the test zone 920. Then the scanner antennas 500 to 506 may similarly be placed in a circle around a common center. According to this assumption, the number of the scanner antennas 500 to 506 and the number of the antennas in the over-the-air chamber may be the same.

A beam width of a scanner antenna 500 to 506 may be similar to or the same as an angle $\Delta\theta$ between two successive antennas in the over-the-air chamber.

An angular beam width of scanner antennas 500 to 506 may be similar to or the same as that of antennas in the over-the-air chamber. According to the assumption, also the polarization of the scanner antennas 116 to 122 is equal with that of the OTA antennas 902 to 916. However, the direction of the scanner antennas 500 to 506 is outwards whereas the direction of the OTA antennas 902 to 916 is inwards towards the test zone 920. The processing unit 202 may map the radio channel data on the OTA antennas by allocating each delay profile associated with a scanner antenna to a corresponding over-the-air antenna 902 to 916.

In such a case, the directional delay profiles 400 to 414 may be mapped on OTA antennas 902 to 916 such that the delay profile 400 is associated with the OTA antenna 902, delay profile 402 is associated with the OTA antenna 904, delay profile 404 is associated with the OTA antenna 906, delay profile 406 is associated with the OTA antenna 908, delay profile 408 is associated with the OTA antenna 910, delay profile 410 is associated with the OTA antenna 912, delay profile 412 is associated with the OTA antenna 914 and delay profile 414 is associated with the OTA antenna 916. However, the mapping may also be made later by an emulator 918 in conjunction with the emulation.

In an embodiment, the receiver 112 comprises directional scanner antennas 500 to 506 the number of which is higher than the number of the OTA antennas 902 to 916. Then the processing unit 202 or an emulator 918 may form the radio channel model such that a directional delay profile of an OTA antenna is based a combination of at least two directional delay profiles of consecutive scanner antennas 500 to 506 at each moment.

In an embodiment, the receiver 112 comprises directional scanner antennas the number of which is lower than the number of the OTA antennas. The processing unit 202 or the emulator 918 may divide at least one directional delay profile of the scanner antennas into at least two delay profiles each of which is for an antenna in the over-the-air chamber.

Figure 5B:
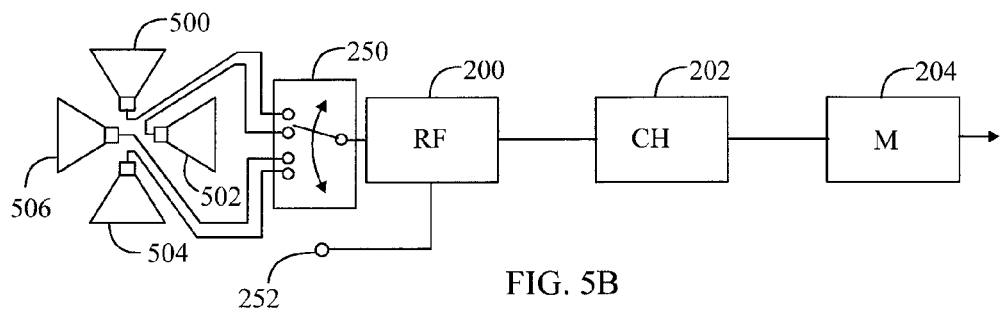
FIG. 5B shows a receiver with an omni-directional antenna and a plurality of directional antennas coupled through a switch to the receiver.

In an embodiment shown in FIG. 5B, one antenna 252 may be an omni-directional element. The omni-directional antenna 252 may use a vertical and/or horizontal polarization. However, the polarization may be neglected in this example. Another antenna structure may be an array of antennas 500 to 506 and a fast electronic switch 250. Antennas 500 to 506 in the array may be directional patch antennas, for example. Although differently presented in FIG. 5B, the antennas 500 to 506 may point to 0°, 45°, 90°, 135°, 180°, 225°, 270°, and 315° for example. The switch 250 may switch each antenna 500 to 506 at a time to contact with other parts 200 to 204 of the receiver. The switching rate may be constant with a constant, and the switching may proceed from antenna to antenna in a clockwise manner, for example. The received signals may be measured and the data thus obtained may be recorded synchronously with the switching pattern. The omni-directional antenna 252 may collect channel data on the basis of measured impulse responses for a playback in the OTA chamber. The omni-directional antenna 252 may receive signals from all azimuth directions (all plane angles) or from all spherical directions (all solid angles). Delay taps may be identified from this data. Then delay taps originating from the omni-directional antenna 252 may be compared with the delay taps originating from the switched directional antennas 500 to 506. If a single tap is observed in data of two directional antennas, its reception angle as AoA (Angle-of-Arrival) and angular spread may be approximated by the power levels of the tap in each of two directional antennas. To form the power, an averaging over time may be required to smooth out the fast fading. Finally, the approximated AoA and angular spread may be applied to map the taps of channel impulse responses which were recorded using the omni-directional antenna 252 to the OTA antennas. This embodiment is in several ways similar to the embodiment described in FIG. 6. However, a difference is that the signals received at the same time are now replaced by temporally consecutive signals. The time sampling rate and the switching rate have to be appropriate to get enough samples of the fading processes. The number of antennas may be duplicated and configured for reception of both orthogonal polarizations. In this case the both polarizations may be captured and processed separately for the MIMO OTA emulation.

Figure 6:
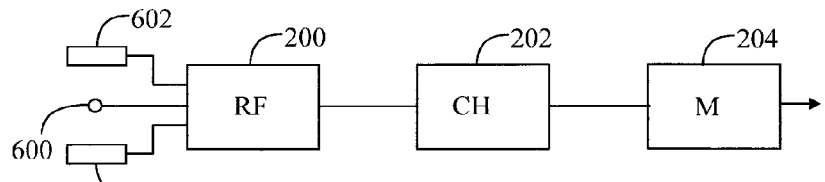
FIG. 6 shows a receiver with an omni-directional antenna and a plurality of directional antennas.

FIG. 6 presents an embodiment where the receiver 112 comprises at least one omni-directional scanner antenna 600 and at least two directional scanner antennas 602, 604, the antennas 600, 602, 604 corresponding to the antennas 116 to 122 of the receiver 112.

In short, one scanner antenna 600 may be used to record the actual channel data for the playback emulation. The scanner antenna 600 is configured to receive the transmission from all azimuth directions. The other antennas 602, 604 may be used to determine arrival angles and/or angular spreads of the multipath components.

In more detail, the processing unit 202 may form a temporal radio channel data by forming the taps of the delay profile on the basis of comparison between data received by the at least one omni-directional antenna 600 and corresponding predetermined data. The processing unit 202 may also form temporal radio channel data of each directional antenna 602, 604 by forming the taps of the delay profile on the basis of comparison between data received by the at least one directional antenna 602, 604 and corresponding predetermined data. The comparison may be performed using correlation. Then the processing unit 202 may estimate reception directions for the taps of the delay profile of the omni-directional antenna 600 on the basis of comparison between the delay profile of the omni-directional antenna 600 and the delay profiles of the directional antennas 602, 604. A radio channel data may be formed by associating taps of the delay profile of the omni-directional with the directions obtained by the comparison of delay profiles.

Figure 7:
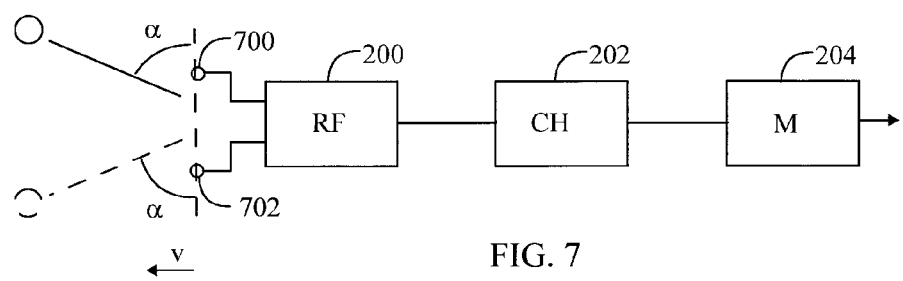
FIG. 7 show a receiver with omni-directional antennas.

FIG. 7 presents an embodiment where the receiver 112 comprises two omni-directional scanner antennas 700, 702 the distance between which is known. The antennas 700, 702 correspond to the antennas 116 to 122 of the receiver 112. In general, the number of the omni-directional scanner antennas 700, 702 may be more than two. The processing unit 202 may form a temporal radio channel data by forming the taps of the delay profile on the basis of comparison between data received by an omni-directional antenna and corresponding predetermined data. The processing unit 202 may measure at least one Doppler shift of the received transmission. The Doppler shift determines whether the receiver 112 is approaching a cluster or the transmitter or moving away from a cluster or the transmitter. It may be assumed that the clusters and the transmitter are not moving or they are assumed to move slowly with respect to the receiver 112. Then if it is determined on the basis of a Doppler shift that the receiver 112 and the cluster or the transmitter are approaching each other, it means that the cluster or the transmitter is ahead i.e. in the front of the receiver 112. Correspondingly, it may be determined that a cluster or the transmitter is behind the receiver 112. When the speed of the receiver 112 is measured or known, a more detailed angle of reception may be determined. The angle of reception α may be determined by dividing a speed $v_D$ estimated on the basis of Doppler shift by the actual speed v of the receiver 112 in a following manner, for example: $\sin(\alpha)=v_D/v$. However, it cannot be known whether the transmission comes from the right or from the left side of the receiver 112.

In an embodiment, the processing unit 202 may measure at least one phase shift of the received transmission between the omni-directional antennas 700, 702 on the basis of the distance between the scanner antennas 700, 702. The distance of the omni-directional antennas 700, 702 may be less than the wavelength of a carrier or less than a half the wavelength of the carrier ($\lambda/2$). Since the distance of the omni-directional antennas 700, 702 and the reception angle α is known, the at least one phase shift of the transmission in different antennas 700, 702 can be estimated. Assume now that a phase shift of a transmission is positive when the transmission comes from the right side of the receiver 112. Then a transmission having the same angle α of reception on the basis of a Doppler shift but coming from left side has the same absolute phase shift but its value is negative. Hence by measuring both the Doppler shift(s) and the phase shift(s) it is possible to determine the reception direction in a plane geometrical configuration.

The processing unit 202 may estimate the reception direction on the basis of the at least one measured Doppler shift and the at least one measured phase shift. The formed radio channel data may be stored in memory 204.

The pre-faded signals synthesis method for the MIMO OTA setup requires temporally independent fading channel coefficient sequences i.e. delay profiles for each OTA antenna 902 to 916. If the sequences of delay profiles can be mapped directly from a number of scanner antennas 116 to 122 to the OTA antennas 902 to 916 that is not a problem. If the number of the receiver antennas 600, 602, 604 and 700, 702 in FIGS. 6 and 7 is different from the number of the OTA antennas 902 to 116, extra fading sequences have to be synthetically generated on the basis of the measured fading sequences. The original measured fading sequence may be mapped to the OTA antenna with the highest allocated power. The other OTA antennas may utilize synthetic sequences. In the case presented in FIG. 6, it may, however, be possible to utilize, at least to a sub-set of OTA antennas, the fading sequences measured with directional antennas. The generation of the synthetic fading sequences may be performed with either or both of the following methods, for example.

1) Statistics, like amplitude distribution, Doppler spectrum, and level crossing rate of the measured fading sequence may be estimated for each tap (and each base station antenna). New synthetic fading sequences may be generated with some known procedure, such as noise filtering or sum-of-sinusoids, from the estimated statistics. This method is applicable for cases presented in FIGS. 6 and 7 where at least one omni-directional antenna is used in the receiver 112.

2) For a case presented in FIG. 7 where only omni-directional antennas are used in the receiver, the synthetic fading sequences may be generated on the basis of decomposition of the Doppler spectrum of the measured fading. At first the Doppler spectrum is estimated for each tap, then the angle of arrival of each spectrum component is estimated. Finally, different spectrum components are allocated to different OTA antennas using a normal MIMO OTA mapping procedure. In other words: H(t) is a measured fading sequence for a single tap. H(v) is the Fourier transformation of H(t). $|H(v)|^2$ is the Doppler power spectrum. For each OTA antenna k, a subset $v \in V_k$ of Doppler shifts v may be selected. Finally the new fading sequence for an OTA antenna k may be hk(t) which may be determined by the inverse Fourier transform of H(v), where $v \in V_k$.

In an embodiment, the processing unit 202 or the emulator 918 may perform noise reduction of the channel data. The noise reduction may be performed by a suitable filtering. For example, the noise reduction may be performed by setting a predetermined noise level for measured channel data, and by removing each tap of the channel data which has a power lower than the predetermined noise level. The noise level may be estimated from delays where there are no taps. According to another example, noise reduction may be performed by averaging samples of channel data over a predetermined time if the sampling rate is higher than the Nyqvist criterion for the channel data. The Nyqvist criterion, in turn, determines generally that any analog signal sampled at a rate exceeding two times the maximum frequency of the analog signal may be reproduced from the samples. In practice, the coherence time of the radio channel may be estimated and the channel estimates may be filtered using a Wiener filter which is adapted with respect to the coherence time.

In an embodiment, the processing unit 202 or the emulator 918 may perform time domain resampling of the channel data for fitting the sample density to that of used in the radio channel emulation. The resampling may comprise interpolation which increases the number of samples. In interpolation, at least one new sample is formed on the basis of existing samples between a pair of existing samples.

The number of data points may also be reduced. The sample sequence may be decimated, punctured or at least two samples may be combined into a new sample using a predetermined operation. In practice, the channel data may be filtered using a suitable low-pass filter if the sampling rate is clearly too high and then excess samples with respect to Nyqvist-criterion may be removed. The signal processing reduces noise as already mentioned above.

Figure 8:
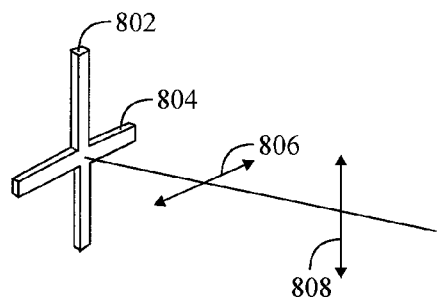
FIG. 8 shows receiver antennas for two orthogonal polarizations.

In an embodiment, polarization may be taken into account. FIG. 8 presents receiver antennas 802, 804 for two orthogonal polarizations. Orthogonal polarization components 806, 808 (e.g. vertical V and horizontal H) may be received independently by two co-located and orthogonally polarized antennas, for example. The orthogonal polarizations may be processed separately like two independent signals. Correspondingly, the orthogonal polarized signals may be transmitted to the DUT 900 using polarized OTA antennas 900 to 916 during emulation.

As shown above, it is possible to gather playback radio channel data with a scanner capable of producing and recording radio channel estimates from a network with a sampling rate higher than the nyquist criterion. The scanner processes downlink (DL) signals of possibly multiple base stations (BS) with multiple antenna and records the channel estimates.

Figure 9:
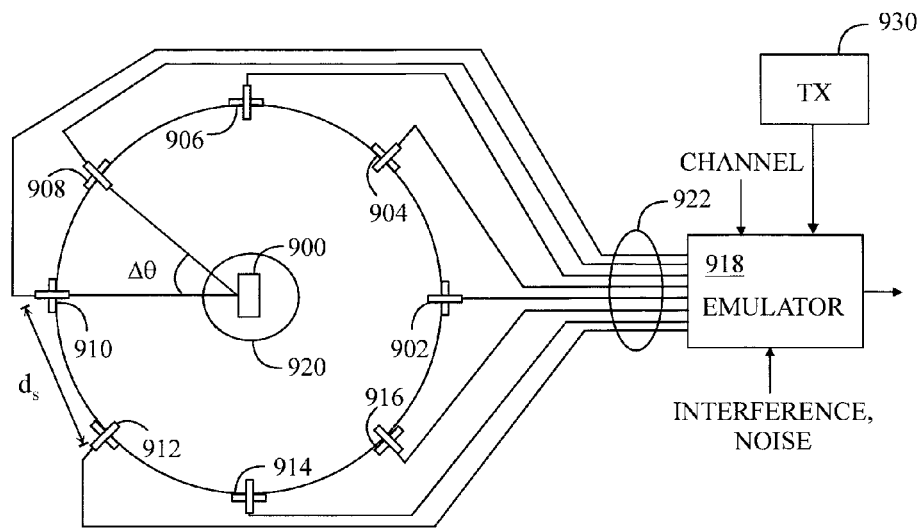
FIG. 9 shows OTA antennas and an emulator.

FIG. 9 presents an OTA test chamber where gathered data of the real radio channel may be used in emulation. OTA antennas 902, 904, 906, 908, 910, 912, 914 and 916 are around a test zone 920 where a DUT 900 may be placed. The crossed shape of the antennas 902 to 916 illustrates orthogonally polarized antennas for polarized transmissions if polarization effects are emulated. The antennas 902 to 916 may have a uniform spacing (e.g. 45° with 8 antennas). Let us denote the directions of K OTA antennas with $\theta_k$, k=1, ..., K and the spacing of an antenna in the angle domain with $\Delta\theta$. The angle $\theta\Delta$ expresses a measure of the separation of two antennas 902 to 916 with respect to the center of the OTA chamber. Each of the antennas is connected to a single emulator output port. If a single antenna is considered, the emulator configuration is 1×8 SIMO, with two antennas 2×8 MIMO etc.

DUT antenna characteristics are assumed unknown. In other words, this information need not be used in the OTA modelling.

The test chamber may be an anechoic room. A DUT 900, such as a subscriber terminal, may be surrounded by antennas 902, 904, 906, 908, 910, 912, 914 and 916, which are coupled to an emulator 918, which may be, for example, EB (Elektrobit) Propsim® F8. The emulator 918 may comprise a processor, a memory and a suitable computer program. At least one transmitter 930 of the emulation may transmit through a desired radio channel to the DUT 900.

In this example, there are eight antennas in a circle separated by a constant angle of 45°. In general, there may be at least two antennas 902 to 916 and they may be separated from each other by a separation angle $\Delta\theta$. When there are at least three antennas 902 to 916, the separation angle $\Delta\theta$ may be the same or different for any two successive antennas 902 to 916. The antennas 902 to 916 may be at the same or different distances from the DUT 900 and the antennas 902 to 916 may be placed only in a sector instead of being placed at a full angle or a full solid angle. The DUT 900 may also have one or more antennas.

Communicating with the DUT 900 over the air enables testing an antenna design, polarization and placement effects in such a way that path directions may be freely included in the testing. That is not possible if a cable connection is used between the emulator 918 and the DUT 900.

The emulator 918 receives a radio channel model for the test. The channel model may be selected by a person accomplishing the test. Additionally, interference and noise may be input to the test in a desirable manner and to a desirable extent. The channel model used may be a play back model based on a recorded channel from a real radio system. However, a part of the radio channel model may be an artificially generated and thus the radio channel model may be a combination of a play back model and an artificially generated model.

The modelling for the OTA environment is different from the conventional emulation, where the impulse responses of different MIMO channels have equal power delay profiles and numbers of taps. In OTA modelling, different taps of a PDP may be fed to the same OTA antenna or different OTA antennas depending on the reception angle of the predetermined data. Hence, the number of taps for different OTA antennas may be the same or different. That can be seen in FIG. 4 when assuming that FIG. 4 presents directional delay profiles to be fed to different OTA antennas 902 to 916 (replace numbers 400 to 414 with numbers 902 to 916).

In an embodiment, the emulator 918 may receive radio channel data of a real radio channel of a radio system comprising delay profiles with taps associated with directional information, the number of the directionally different delay profiles being lower than the number of the antennas in the over-the-air chamber. Then the emulator 918 may form a delay profile of an over-the-antenna by dividing at least one delay profile into at least two delay profiles, each of which is for different antennas in the over-the-air chamber.

The measured taps of a power delay profile may be divided between two OTA antennas 902 to 916 on the basis of OTA antenna angles $\theta_k$ and an angle $\phi_n$ associated with a tap, the angle representing a reception direction of the receiver 112. The angle $\theta_k$ of an OTA antenna k closest to the angle $\phi_n$ associated with a tap may be found according to the following mathematical equation $$\theta_k = \Delta\theta \text{int}\left(\frac{\min_j\left(\theta_j + \frac{1}{2}\Delta\theta - \varphi_n\right)}{\Delta\theta}\right),$$

where min means the minimum value of the expression among all values of $\theta_j$, int means an integer value of the division (including 0). The value of k is $$\text{int}\left(\frac{\min_j\left(\theta_j + \frac{1}{2}\Delta\theta - \varphi_n\right)}{\Delta\theta}\right).$$

The second OTA antenna k+1 may then be the one having an angle $\theta_k+\Delta\theta=\theta_{k+1}$. Hence, the selected OTA antennas may be those which represent the directions between which the direction of each tap is associated. The radio channel is generated in the direction of taps with respect to the DUT 900.

A selection of the OTA antennas for a tap n can be done by selecting the two closest values of $\theta_k$ for the angle $\phi_n$ associated with a tap. The power of a tap n is divided between the two OTA antennas depending on angular distance between $\theta_k$ and $\phi_n$. If e.g. the angle of a tap $\phi_n$ is exactly on the middle between $\theta_k$ and $\theta_{k+1}$, the power is divided such that it is 50% for each.

A weight $w_{n,k}$ for each antenna 402 to 416 may be calculated in the following manner, for example $$w_{n,k} = 1 - \frac{|\theta_{k+i} - \varphi_n|}{\Delta\theta},$$

where i is either 1 or 2, k is the index of an antenna closest to the angle $\phi_n$ of a tap n. The power $P_n$ of the tap n to an antenna k is multiplied by a weight $w_{n,k}$ such that $P_k+P_{k+1}=P_n$. The power of a tap H may be expressed as square of absolute value of tap H, i.e. $|H|^2$.

Figure 10:
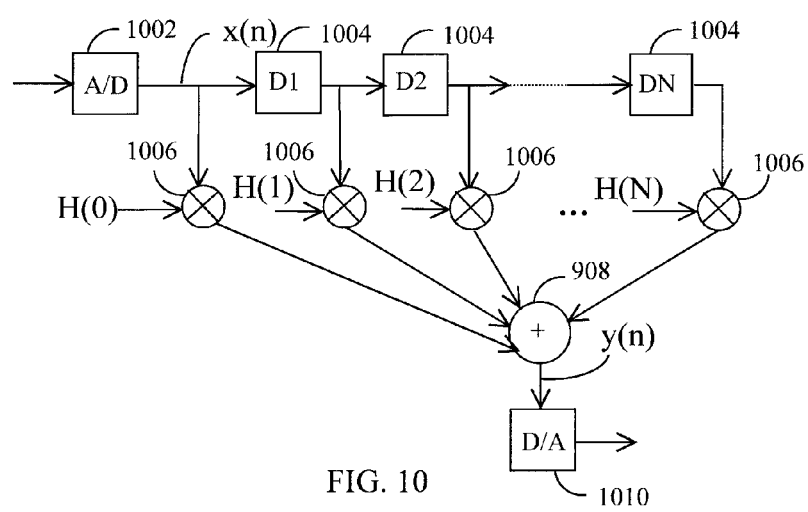
FIG. 10 shows a FIR filter.

FIG. 10 shows a block diagram of a FIR (Finite Impulse Response) filter which may comprise an analog-to-digital converter 1002, delay elements 1004 arranged as a shift register, a multiplier 1006, a summer 1008 and a digital-to-analog converter 1010. The analog-to-digital converter 1002 receives an analog signal. The basic function of an FIR filter is as follows. The digital input signal x(n) from an analog-to-digital converter 1002 is delayed in each delay element 1004, whose delays may have the same or different length in time, and the delayed signals are multiplied in the multipliers 1006 by the desired channel coefficient H(i), where i=[0, . . . , N]. A channel model is defined by the channel coefficients H=[H(0), . . . , H(N)], which can be considered the taps of the delay profile or channel estimates of the radio channel. The signal components are summed in a summer 1008 and the summed signal is converted to an analog form in the digital-to-analog converter 1010. Hence, a signal passing through the FIR filter will experience a radio channel defined by the radio channel model formed on the basis of gathered radio channel data H. Each OTA antenna 902 to 916 may receive its signal from at least one FIR filter. Each transmitter of the emulation may pass its signal through a FIR filter.

Figure 11:
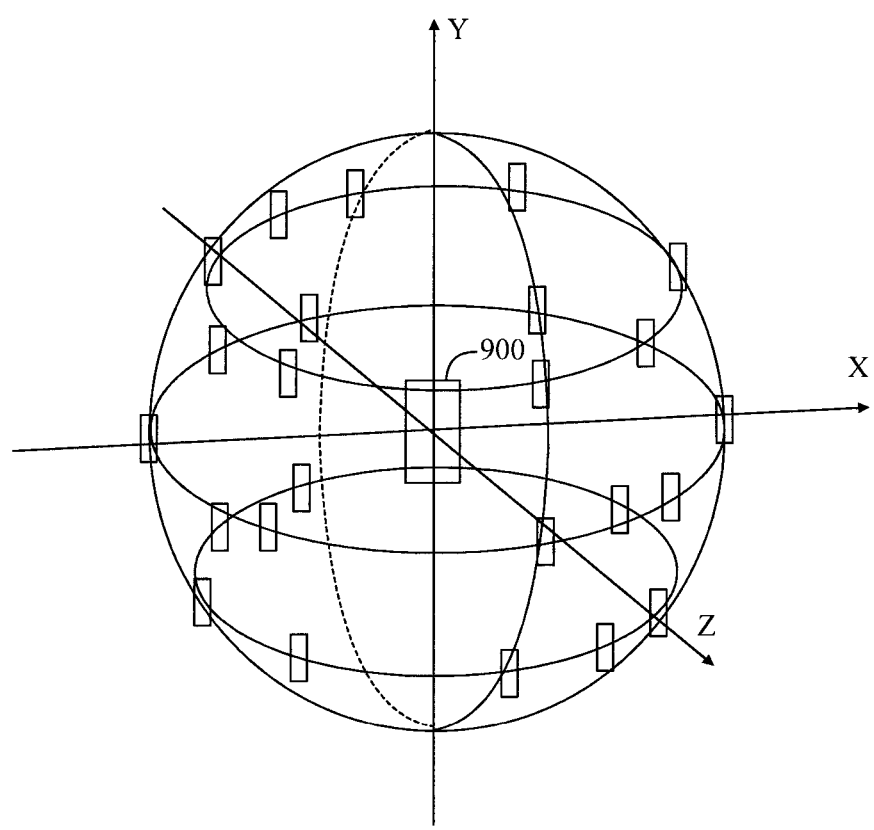
FIG. 11 shows a three-dimensional configuration of antennas.

FIG. 11 presents a solid geometrical configuration of the OTA antennas 902 to 916 and/or the antennas 116 to 122 of the receiver 112. In this example, the antennas (rectangles) are placed (as if) on a surface of a sphere. In an OTA chamber, the DUT 900 may be placed in the middle of the sphere. However, the surface on which the antennas are (as if) placed may be a part of any surface which encloses a volume. Examples of such surfaces are a surface of a cube, an ellipsoid, a tedraedra, etc. The antennas may be polarizing antennas or non-polarizing antennas.

In an embodiment, plane waves may be transmitted from the OTA antennas 902 to 916 such that their interference in the test zone 920 forms a desired radio channel between the DUT 900 and the transmitter for the transmitted signals. The emulator 918 may form a weight for each signal path 922 associated with an antenna 902 to 916 of a plurality of antennas around a test zone 920 in an over-the-air chamber by a comparison of a desired target electric field based on a radio channel model and an electric field obtainable by plane waves associated with the test zone 920, the plane waves being transmittable by the antennas 902 to 916 and being based on at least one basis waveform in each signal path 922. This solution is described in more detail in a patent application PCT/FI2011/050190.

Figure 12:
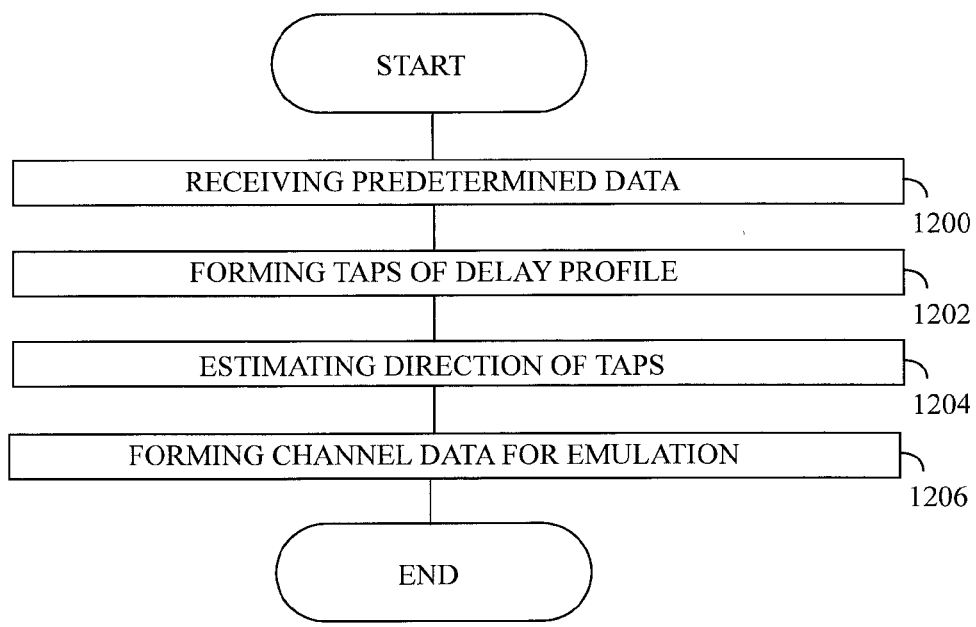
FIG. 12 shows a flow chart of the method in the receiver.

FIG. 12 presents the flow chart of the method in the receiver. In step 1200, wireless transmission comprising predetermined data is received from at least one base station of a radio system as a function of reception direction. In step 1202, taps of a delay profile are formed on the basis of comparison between the data that is received and corresponding predetermined data. In step 1204, direction for the taps of the delay profile is estimated on the basis of a reception direction. In step 1206, the radio channel data is formed, for a radio channel model in a multiple input multiple output emulation in an over-the-air chamber having a plurality of antennas around a test zone where a device-under-test is placeable, by associating the taps of the delay profile with the estimated direction.

Figure 13:
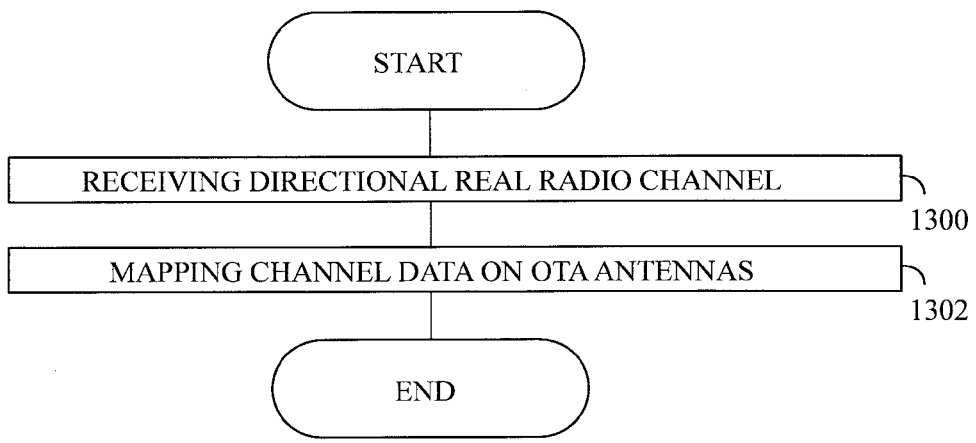
FIG. 13 shows a flow chart of the method in the emulator.

FIG. 13 presents the flow chart of the method in the emulator. In step 1300, radio channel data of a real radio channel of a radio system comprising directional delay profiles with taps associated with directional information is received. In step 1302, the radio channel data is mapped on the antennas of the over-the-air chamber by allocating directionally different taps of delay profiles to different over-the-air antennas.

In an example embodiment, the one or more memories may further store instructions, that, when executed by the one or more processors, cause the receiver 112 to perform the steps of the method of FIG. 12.

In an example embodiment, the one or more memories may further store instructions, that, when executed by the one or more processors, cause the emulator 918 to perform the steps of the method of FIG. 13.

As presented above, the recorded radio channel may played back in an anechoic chamber as in EB (Elektrobit) MIMO OTA application. Performance of DUT 900 may be measured without taking it to a field test. The test is repeatable and problematic conditions can be identified and tested in a controlled manner.

An emulation of a real radio channel is possible on the basis of Virtual Drive Testing (VDT) measurements presented in this application. VDT has been combined with the over-the-air testing of multi-antenna terminals (MIMO OTA), where full terminals, with antennas, can be measured is an environment imitating a specific driving route in a wireless network.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The processing unit 202 and the emulator 918 capable of performing the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The receiver 112 including the processing unit 202 and the emulator 918 comprise circuitries which refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

As a further example, the term 'circuitry' would also cover an implementation of merely a processor (or multiple processors) or a portion of a processor and its (or their) accompanying software and/or firmware.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatuses may also be implemented as one or more integrated circuits, such as application-specific integrated circuits ASIC (Application Specific Integrated Circuit). Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

What is claimed is:

1. An apparatus, wherein the apparatus comprises: a receiver configured to receive wireless transmission of a real radio system comprising predetermined data from at least one base station of a radio system as a function of reception direction; and a processing unit configured to: form taps of a delay profile on the basis of comparison between the data that is received from a base station and corresponding predetermined data that at least one base station transmitted, estimate direction for the taps of the delay profile on the basis of a reception direction of the transmission, and form radio channel data, for a radio channel model in a multiple input multiple output emulation in an over-the-air chamber having a plurality of antennas around a test zone where a device-under-test is placeable, by associating the taps of the delay profile with the estimated direction.

2. The apparatus of claim 1, wherein the receiver comprises a plurality of directional scanner antennas, the processing unit being configured to associate each tap of the delay profile of an scanner antenna with a direction of the scanner antenna.

3. The apparatus of claim 1, wherein the receiver comprises at least one omni-directional scanner antenna and at least two directional scanner antennas, the processing unit being configured to form the taps of the delay profile on the basis of comparison between data received by the at least one omni-directional antenna and corresponding predetermined data, and estimate direction for the taps of the delay profile on the basis of reception directions of the at least two directional scanner antennas.

4. The apparatus of claim 1, wherein the receiver comprises a plurality of omni-directional scanner antennas the distance between which is known, the processing unit being configured to:
form the taps of the delay profile on the basis of comparison between data received by an omni-directional antenna and corresponding predetermined data;
measure at least one Doppler shift of the received transmission;
measure at least one phase shift of the received transmission between the omni-directional antennas on the basis of the distance between the scanner antennas, and
estimate at least one reception direction on the basis of the at least one measured Doppler shift and the at least one measured phase shift.

5. The apparatus of claim 1, wherein the processing unit is configured to perform noise reduction of the channel data.

6. The apparatus of claim 1, wherein the processing unit is configured to perform time domain resampling of the channel data for fitting the sample density to that used in the radio channel emulation.

7. An apparatus, wherein the apparatus is configured to: receive radio channel data of a real radio channel of a radio system comprising directional delay profiles with taps associated with directional information, and map the radio channel data on antennas of an over-the-air chamber by allocating directionally different taps of delay profiles to different over-the-air antennas, wherein the number of the directionally different delay profiles and the number of the antennas in the over-the-air chamber are the same, the apparatus being configured to allocate taps of a directional delay profile to a predetermined over-the-air antenna.

8. The apparatus of claim 7, wherein the number of the directionally different delay profiles is higher than the number of the antennas in the over-the-air chamber, the apparatus being configured to form a delay profile of an over-the-antenna on the basis of at least two consecutive delay profiles.

9. The apparatus of claim 7, wherein the number of the directionally different delay profiles is lower than the number of the antennas in the over-the-air chamber, the apparatus being configured to form a delay profile of an over-the-antenna by dividing at least one delay profile into at least two delay profiles, each of which is for different antennas in the over-the-air chamber.

10. A method, the method comprising: receiving, using a processing device, wireless transmission comprising predetermined data from at least one base station of a radio system as a function of reception direction; forming, using the processing device, taps of a delay profile on the basis of comparison between the data that is received from a base station and corresponding predetermined data that at least one base station transmitted; estimating, using the processing device, direction for the taps of the delay profile on the basis of a reception direction; and forming, using the processing device, the radio channel data, for a radio channel model in a multiple input multiple output emulation in an over-the-air chamber having a plurality of antennas around a test zone where a device-under-test is placeable, by associating the taps of the delay profile with the estimated direction.

11. The method of claim 10, the method further comprising:
receiving the wireless transmission by a plurality of directional scanner antennas, and
associating each tap of the delay profile of an scanner antenna with a direction of the scanner antenna.

12. The method of claim 10, the method further comprising:
receiving the wireless transmission by at least one omnidirectional scanner antenna and by at least two directional scanner antennas;
forming the taps of the delay profile on the basis of comparison between data received by the at least one omnidirectional antenna and corresponding predetermined data; and
estimating direction for the taps of the delay profile on the basis of the reception direction of the at least two directional scanner antennas.

13. The method of claim 10, the method further comprising:
receiving the wireless transmission by a plurality of omnidirectional scanner antennas the distance between which is known;
forming the taps of the delay profile on the basis of comparison between data received by an omni-directional antenna and corresponding predetermined data;
measuring at least one Doppler shift of the received transmission;
measuring at least one phase shift of the received transmission between the omni-directional antennas on the basis of the distance between the scanner antennas; and
estimating at least one reception direction on the basis of the at least one measured Doppler shift and the at least one measured phase shift.

14. The method of claim 10, further comprising performing noise reduction of the channel data.

15. The method of claim 10, further comprising performing time domain resampling of the channel data for fitting the sample density to that of used in the radio channel emulation.

16. A method, comprising: receiving, using a processing device, radio channel data of a real radio channel of a radio system comprising directional delay profiles with taps associated with directional information; mapping, using the processing device, the radio channel data on antennas of an over-the-air chamber by allocating directionally different taps of delay profiles to different over-the-air antennas; forming, using the processing device, a delay profile of an over-the-antenna by dividing at least one directional delay profile into at least two delay profiles; and allocating, using the processing device, each of the divided delay profiles for different antennas in the over-the-air chamber while the number of the directionally different delay profiles is lower than the number of the antennas in the over-the-air chamber.

17. The method of claim 16, further comprising allocating taps of a directional delay profile to a predetermined over-the-air antenna while the number of the directionally different delay profiles and the number of the antennas in the over-the-air chamber are the same.

18. The method of claim 16, further comprising forming a delay profile of an over-the-antenna on the basis of at least two consecutive directional delay profiles while the number of the directionally different delay profiles are higher than the number of the antennas in the over-the-air chamber.

19. An apparatus comprising: at least one processor; and at least one memory including a computer program code, wherein the at least one memory and the computer program code are configured, with the at least one processor, to cause the apparatus at least to perform a computer process comprising: receiving wireless transmission comprising predetermined data from at least one base station of a radio system as a function of reception direction; forming taps of a delay profile on the basis of comparison between the data that is received from a base station and corresponding predetermined data that at least one base station transmitted; estimating direction for the taps of the delay profile on the basis of a reception direction; and forming the radio channel model, for a radio channel model for a multiple input multiple output emulation in an over-the-air chamber having a plurality of antennas around a test zone where a device-under-test is placeable, by associating the taps of the delay profile with the estimated direction.

20. A non-transitory computer-readable medium comprising instructions which, when executed by an apparatus, cause the apparatus to perform a computer process comprising: receiving wireless transmission comprising predetermined data from at least one base station of a radio system as a function of reception direction; forming taps of a delay profile on the basis of comparison between the data that is received from a base station and corresponding predetermined data that at least one base station transmitted; estimating direction for the taps of the delay profile on the basis of a reception direction; and forming the radio channel model, for a radio channel model for a multiple input multiple output emulation in an over-the-air chamber having a plurality of antennas around a test zone where a device-under-test is placeable, by associating the taps of the delay profile with the estimated direction.

* * * * *